(12) United States Patent
Sui et al.

(10) Patent No.: US 8,459,379 B2
(45) Date of Patent: *Jun. 11, 2013

(54) BEARING CONTACT PRESSURE REDUCTION IN WELL TOOLS

(75) Inventors: Ping C. Sui, The Woodlands, TX (US); Gary E. Weaver, Conroe, TX (US)

(73) Assignee: Halliburton Energy Services, Inc., Houston, TX (US)

(*) Notice: Subject to any disclaimer, the term of this patent is extended or adjusted under 35 U.S.C. 154(b) by 251 days.

This patent is subject to a terminal disclaimer.

(21) Appl. No.: 12/685,821

(22) Filed: Jan. 12, 2010

(65) Prior Publication Data

US 2011/0168407 A1 Jul. 14, 2011

(51) Int. Cl.
*E21B 10/22* (2006.01)

(52) U.S. Cl.
USPC .......................................................... 175/371

(58) Field of Classification Search
USPC ...................... 175/371, 372; 384/95
See application file for complete search history.

(56) References Cited

U.S. PATENT DOCUMENTS

| | | | | |
|---|---|---|---|---|
| 3,866,987 | A | * | 2/1975 | Garner .............................. 384/95 |
| 4,889,195 | A | * | 12/1989 | Kruger et al. .................. 175/107 |
| 5,125,754 | A | * | 6/1992 | Ide .................................. 384/122 |
| 5,163,521 | A | | 11/1992 | Pustanyk et al. |
| 5,174,738 | A | | 12/1992 | Baumann et al. |
| 5,265,964 | A | | 11/1993 | Hooper |
| 5,307,887 | A | | 5/1994 | Welsh |
| 5,472,058 | A | * | 12/1995 | Hooper et al. ................. 175/371 |
| 5,520,255 | A | | 5/1996 | Barr et al. |
| 5,678,829 | A | | 10/1997 | Kalsi et al. |
| 6,095,262 | A | | 8/2000 | Chen |
| 6,109,376 | A | | 8/2000 | Pearce |
| 6,213,225 | B1 | | 4/2001 | Chen |
| 6,360,831 | B1 | | 3/2002 | Akesson et al. |
| 6,401,839 | B1 | | 6/2002 | Chen |
| 6,412,577 | B1 | | 7/2002 | Chen |
| 6,460,635 | B1 | | 10/2002 | Kalsi et al. |
| 6,581,699 | B1 | | 6/2003 | Chen et al. |
| 6,863,124 | B2 | | 3/2005 | Araux et al. |
| 7,387,177 | B2 | | 6/2008 | Zahradnik et al. |
| 7,401,666 | B2 | | 7/2008 | Fanuel et al. |
| 7,434,632 | B2 | | 10/2008 | Chen et al. |
| 7,703,982 | B2 | * | 4/2010 | Cooley .............................. 384/95 |
| 7,946,768 | B2 | * | 5/2011 | Cooley et al. ................... 384/95 |
| 2006/0065445 | A1 | | 3/2006 | Chellappa et al. |
| 2006/0171616 | A1 | * | 8/2006 | Richie et al. ................... 384/121 |

(Continued)

OTHER PUBLICATIONS

Search Report issued Jun. 23, 2011 for International Patent Application Serial No. PCT/US11/25430, 5 pages.

(Continued)

*Primary Examiner* — William P Neuder
(74) *Attorney, Agent, or Firm* — Smith IP Services, P.C.

(57) ABSTRACT

A method of reducing contact pressure between bearing surfaces of a well tool can include constructing a structure which supports one bearing surface in contact with the other bearing surface, and reducing contact pressure between the bearing surfaces by relieving strain energy in the structure. A well tool can include one bearing surface which contacts another bearing surface. There is a transition between contact and lack of contact between the bearing surfaces. A structure supporting one of the bearing surfaces can have a reduced stiffness, whereby a contact pressure between the bearing surfaces is reduced at the transition. The bearing surfaces can be formed on a thrust bearing, plain bearing, or other type of bearing between components of the well tool.

41 Claims, 17 Drawing Sheets

U.S. PATENT DOCUMENTS

| | | |
|---|---|---|
| 2009/0194945 A1 | 8/2009 | Bhat et al. |
| 2010/0226759 A1* | 9/2010 | Cooley et al. ............... 415/170.1 |
| 2011/0168450 A1* | 7/2011 | Sui et al. ...................... 175/371 |
| 2011/0174547 A1* | 7/2011 | Sexton et al. ................. 175/371 |

OTHER PUBLICATIONS

Written Opinion issued Jun. 23, 2011 for International Patent Application Serial No. PCT/US11/25430, 3 pages.

Halliburton, Security DBS Drill Bits product brochure, 2005, 2 pages.

Halliburton, Energy Balanced® Series Roller Cone Bits product brochure, 2005, 1 page.

Alaskan Energy Resources, Inc., Security DBS Drill Bits product brochure, 2006, 4 pages.

International Search Report with Written Opinion issued Jun. 23, 2011 for PCT/US11/025430, 8 pages.

International Search Report with Written Opinion issued Aug. 26, 2011 for PCT/US11/025427, 8 pages.

Specification and Drawings for PCT Patent Application No. PCT/US11/62654, filed Nov. 30, 2011, 20 pages.

Office Action issued Jul. 12, 2012 for U.S. Appl. No. 12/685,807, 16 pages.

Specification and Drawings for U.S. Appl. No. 13/665,578, filed Oct. 12, 2012, 22 pages.

Office Action issued Dec. 12, 2012 for U.S. Appl. No. 12/685,807, 18 pages.

* cited by examiner

BEARING CONTACT PRESSURE REDUCTION IN WELL TOOLS

BACKGROUND

This disclosure relates generally to equipment utilized and operations performed in conjunction with subterranean wells and, in an example described below, more particularly provides for bearing contact pressure reduction in well tools.

Bearing failure is a common problem affecting conventional well tools used in conjunction with subterranean wells. Such failures will generally require that the well tools be retrieved for replacement or maintenance, resulting in substantial loss of time and money.

Bearing failures can be due to a variety of factors. However, if the maximum contact pressure between bearing surfaces could be substantially reduced, bearing failures could also be reduced significantly.

DETAILED DESCRIPTION

Figure 1:
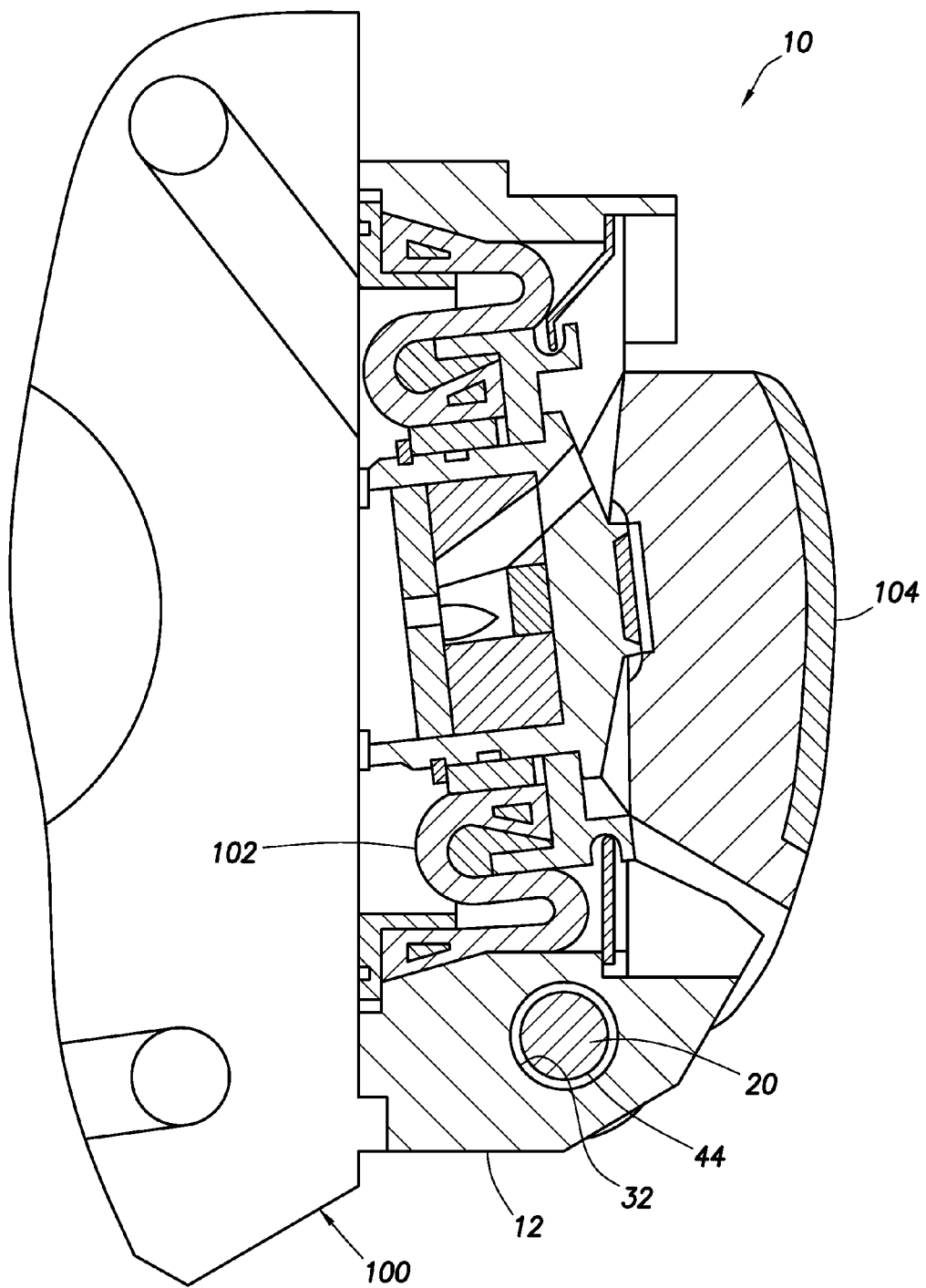
FIGS. 1-6 are schematic cross-sectional views of examples of a well tool which can embody principles of the present disclosure.

The principles of this disclosure are applicable to a wide variety of different types of well tools. Several examples of the kind of well tool which can incorporate the principles of this disclosure to reduce contact pressure between bearing surfaces in the well tool are provided below.

However, it should be clearly understood that the principles of this disclosure are not limited to only the well tool examples described below. Instead, any type of well tool which includes bearing surfaces can benefit from the principles described below.

In the description below, to emphasize the general applicability of the principles of this disclosure to any well tool, the reference number 10 is used to indicate a generic well tool, the reference numbers 12 and 20 are used to indicate generic components of the well tool, and the reference numbers 32 and 44 are used to indicate generic bearing surfaces on those components. The components 12, 20 may rotate, slide or otherwise displace relative to each other. The bearing surfaces 32, 44 may form portions of plain bearings, thrust bearings, hydrodynamic bearings, or any other type of bearing.

One problem with conventional well tool bearing designs is that, at transitions in the bearing surfaces, very high contact pressures can be experienced. These very high contact pressures cause considerable material loss on components due to sliding wear and, in extreme cases, can result in premature failure of the bearing surfaces, thereby reducing or destroying the effectiveness of the well tool 10, requiring replacement of the well tool, and thereby causing loss of time and money in an associated operation. Fortunately, these drawbacks of conventional well tool bearing designs can be minimized or eliminated by employing the principles described in this disclosure.

Representatively illustrated in FIG. 1 is an example of the well tool 10 which can embody principles of this disclosure. The well tool 10 example depicted in FIG. 1 is of the type known to those skilled in the art as a rotary steerable device.

Specifically, illustrated in FIG. 1 is a portion of a modulated bias unit 100 for controlling the direction of drilling of a rotating drill bit. The modulated bias unit 100 depicted in FIG. 1 is similar in many respects to that described in U.S. Pat. No. 5,520,255.

The modulated bias unit 100 includes a number of hydraulic actuators 102 spaced apart around the periphery of the unit. The hydraulic actuators 102 are used to displace a movable thrust member 104 outward into engagement with a formation surrounding a borehole being drilled.

The thrust member 104 pivots relative to a structural component 12 of the unit 100. In this example, the thrust member 104 is mounted on a component 20 (such as a pivot pin). A cylindrical bearing surface 32 in the component 12 engages a cylindrical bearing surface 44 on the component 20.

Figure 2:
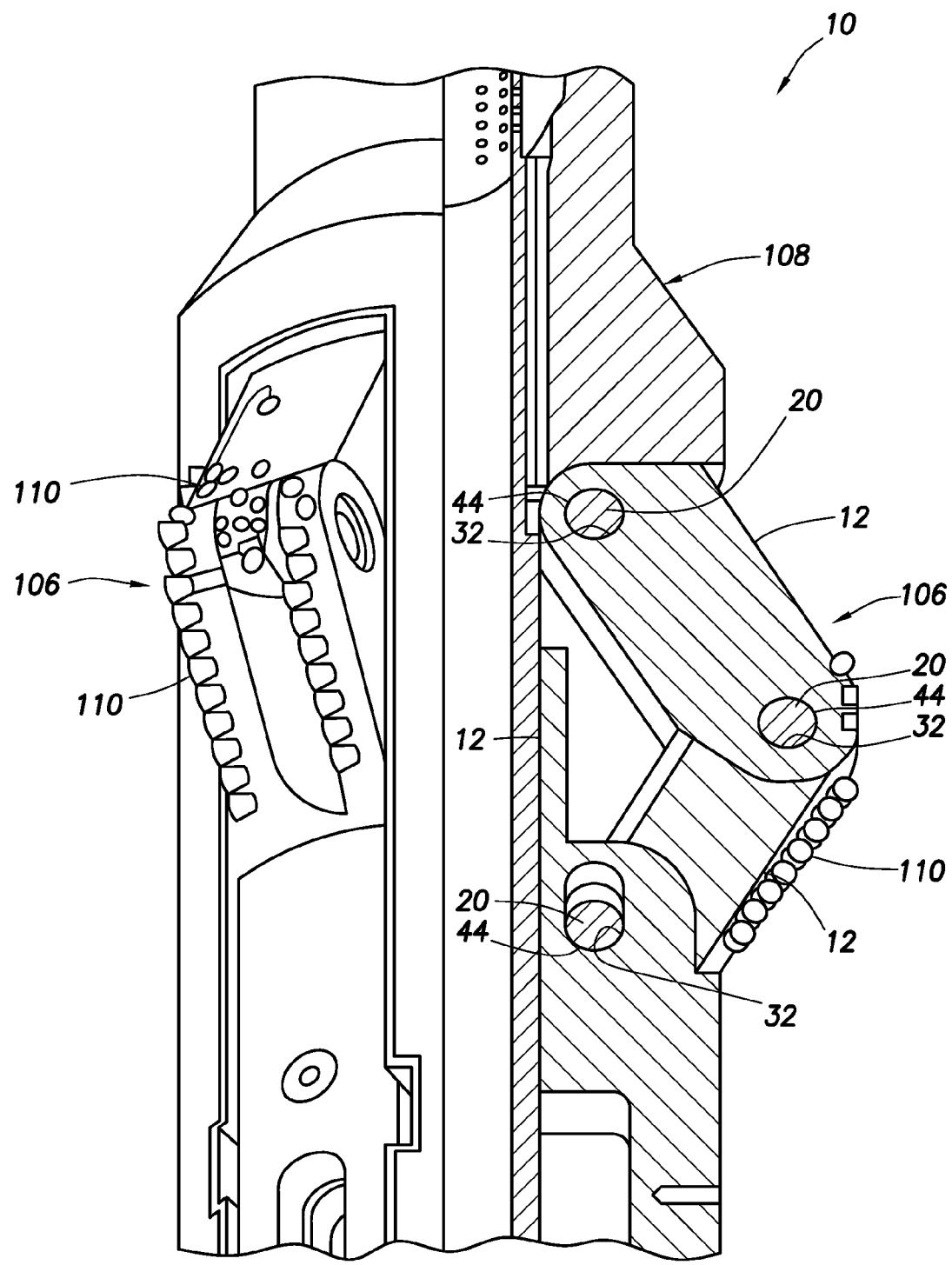

Referring additionally to FIG. 2, another example of the well tool 10 is representatively illustrated. In this example, the well tool 10 is of the type known to those skilled in the art as a wellbore reamer (also known as an underreamer or expandable reamer).

For various reasons, it may be desirable to widen the diameter of a borehole after it has been drilled. The wellbore reamer as depicted in FIG. 2 is similar in many respects to that described in U.S. Pat. No. 7,401,666, and is of the type which is typically used to widen a borehole after casing has been set. The wellbore reamer is interconnected as part of a drill string, is conveyed into the borehole with the drill string, and is rotated with the drill string to thereby widen the borehole.

Multiple cutting assemblies 106 are supported in a housing assembly 108. Each cutting assembly 106 includes arm components 12 which pivot on pin components 20. The arm components 12 have cutting elements 110 mounted on them.

Another component 12 displaces upward to extend the arm components 12 outward to thereby cause the cutting elements 110 to cut into the wall of the borehole as the drill string rotates. While the cutting assemblies 106 are extended outward and cutting into the wall of the borehole, very high bearing forces are borne by the bearing surfaces 32, 44 on the components 12, 20.

Figure 3:
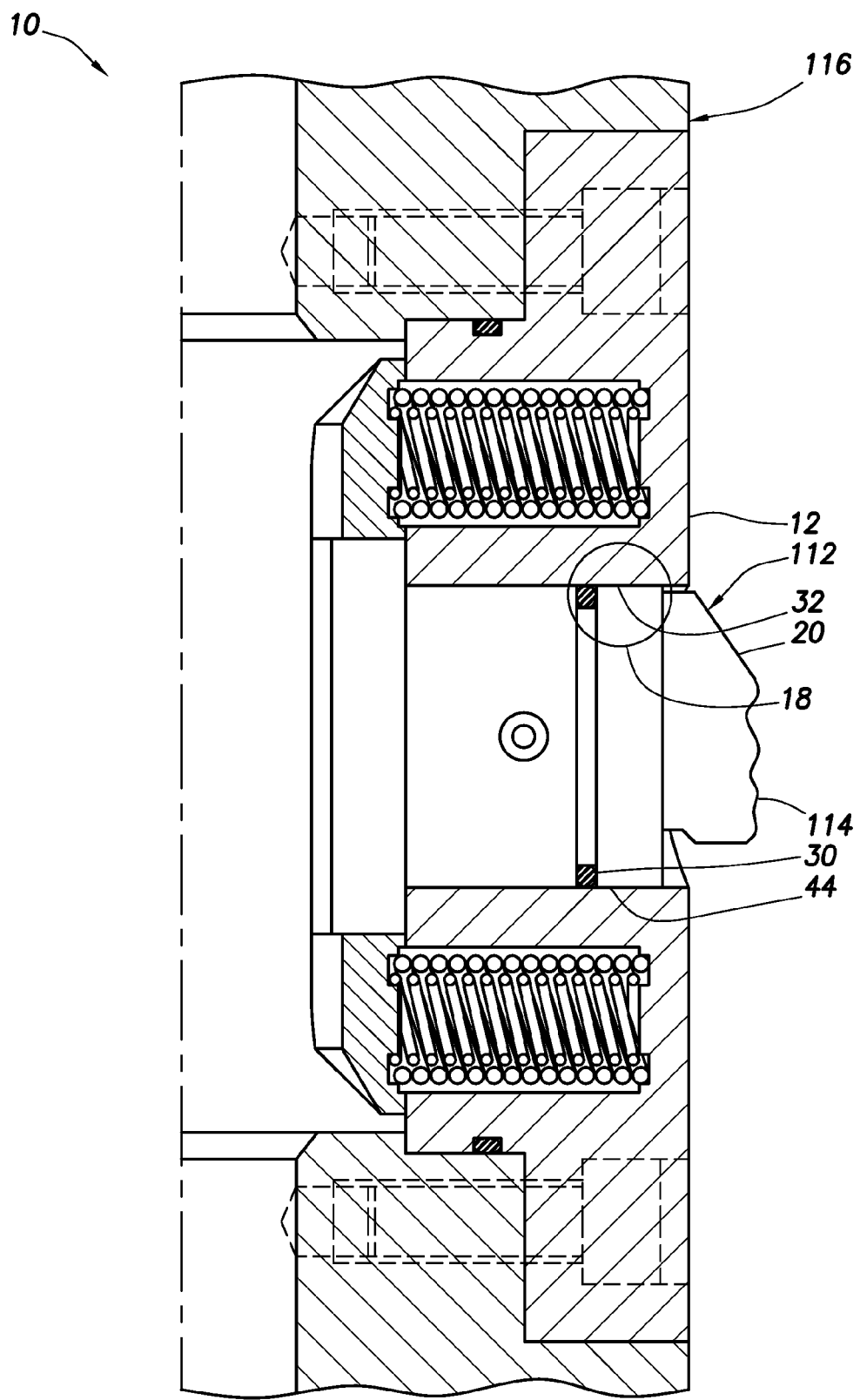

Referring additionally now to FIG. 3, another example of the well tool 10 is representatively illustrated. In this example, the well tool 10 is of the type known to those skilled in the art as a near bit wellbore reamer.

Multiple cutting assemblies 112 are disposed about a housing assembly 116. Each cutting assembly 112 includes a component 20, which comprises a piston on which multiple cutting elements 114 are carried.

A seal 30 on the piston seals the component 20 in the surrounding structural component 12. The wellbore reamer of FIG. 3 is similar in many respects to that described in U.S. Pat. No. 6,360,831.

When extended outward as depicted in FIG. 3, and rotated with a drill string in which the wellbore reamer is interconnected, the cutting elements 114 can cut into the wall of a formation surrounding a borehole. While the cutting assemblies 106 are extended outward and cutting into the wall of the borehole, very high bearing forces are borne by the bearing surfaces 32, 44 on the components 12, 20.

Figure 4:
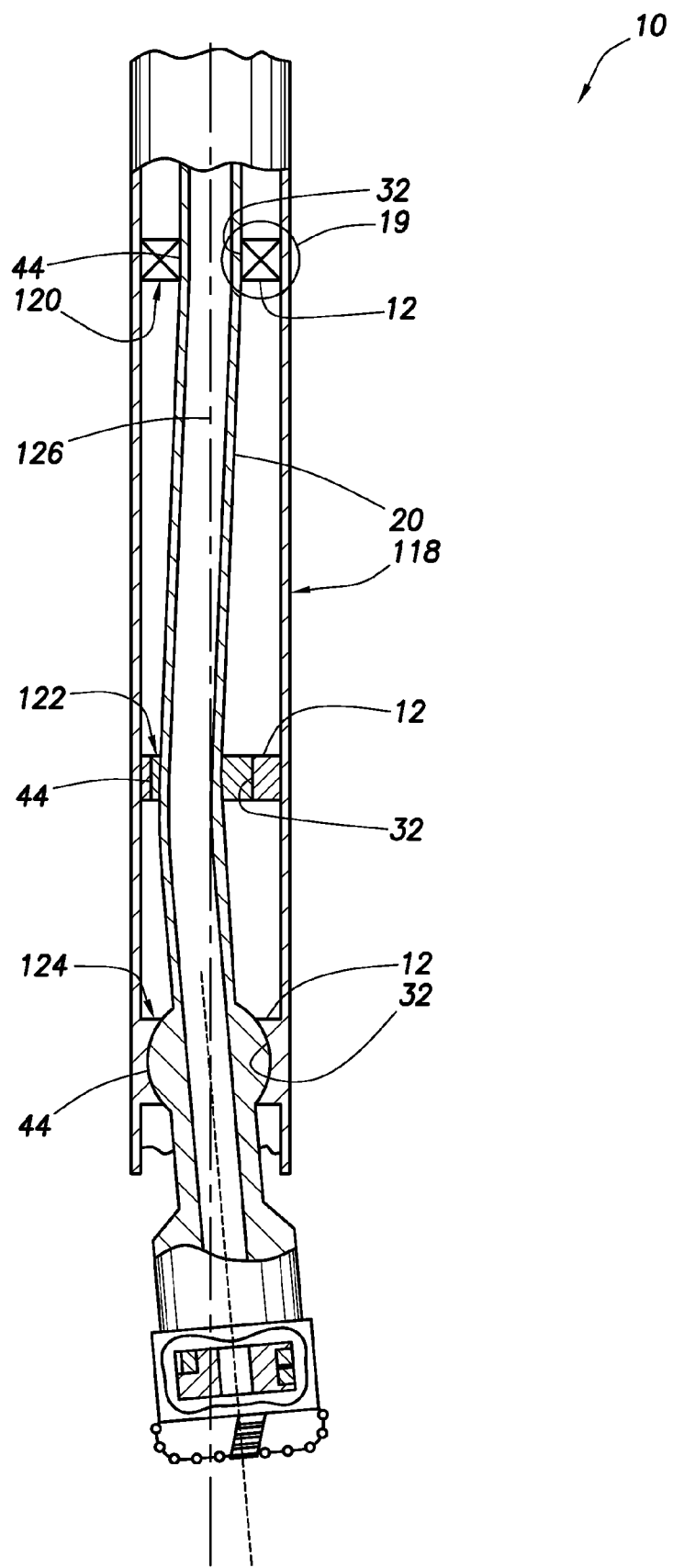

Referring additionally now to FIG. 4, another example of the well tool 10 is representatively illustrated. In this example, the well tool 10 is of the type known to those skilled in the art as a rotary steerable device.

The component 20 comprises a continuous, hollow, rotating shaft within an outer housing assembly 118. The shaft is supported at three axially spaced apart positions by components 12. The upper component 12 comprises a cantilever bearing 120, the middle component comprises an eccentric cam unit 122, and the lower component comprises a spherical bearing 124.

To change the direction of drilling, the eccentric cam unit 122 is used to displace the middle of the shaft relative to a longitudinal axis 126 of the rotary steerable device. The rotary steerable device depicted in FIG. 4 is similar in many respects to that described in U.S. Pat. No. 6,581,699.

When the middle of the shaft is laterally offset relative to the axis 126 as shown in FIG. 4 and a borehole is being drilled by rotating the shaft (for example, with a mud motor), very high contact pressures are experienced between the bearing surfaces 32, 44.

Figure 5:
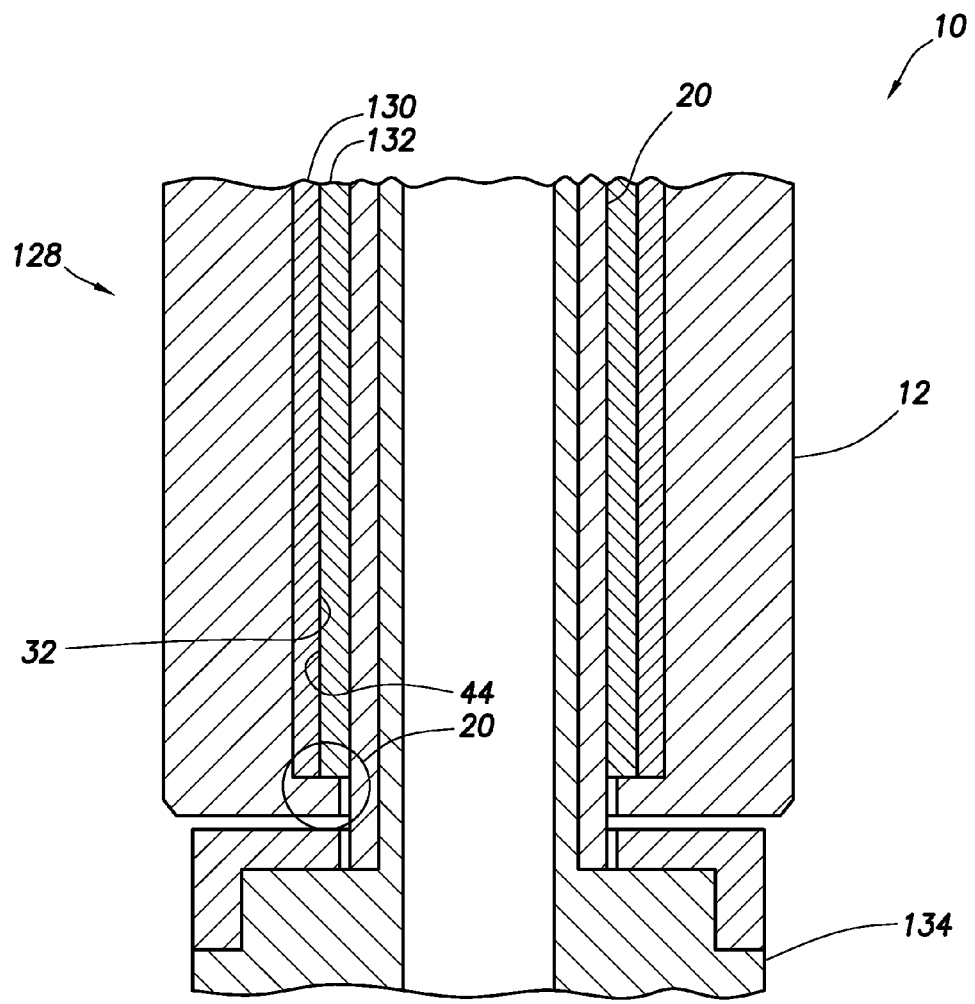

Referring additionally now to FIG. 5, another example of the well tool 10 is representatively illustrated. In this example, the well tool 10 is of the type known to those skilled in the art as a fluid motor (also known as a mud motor). A fluid motor is used in drilling operations to rotate a drill bit in response to flow of fluid through the fluid motor.

Depicted in FIG. 5 is a portion of a lower bearing sub 128 of the fluid motor. The component 20 is rotated by the fluid motor relative to the outer component 12. The bearing surfaces 32, 44 are formed on bearing sleeves 130, 132, with the outer sleeve being a wear sleeve, and the inner sleeve being a radial bearing.

The component 20 rotates with a mandrel 134, which is rotated in response to flow of fluid through the fluid motor. The fluid motor is similar in many respects to that described in U.S. Pat. No. 5,163,521.

Figure 6:
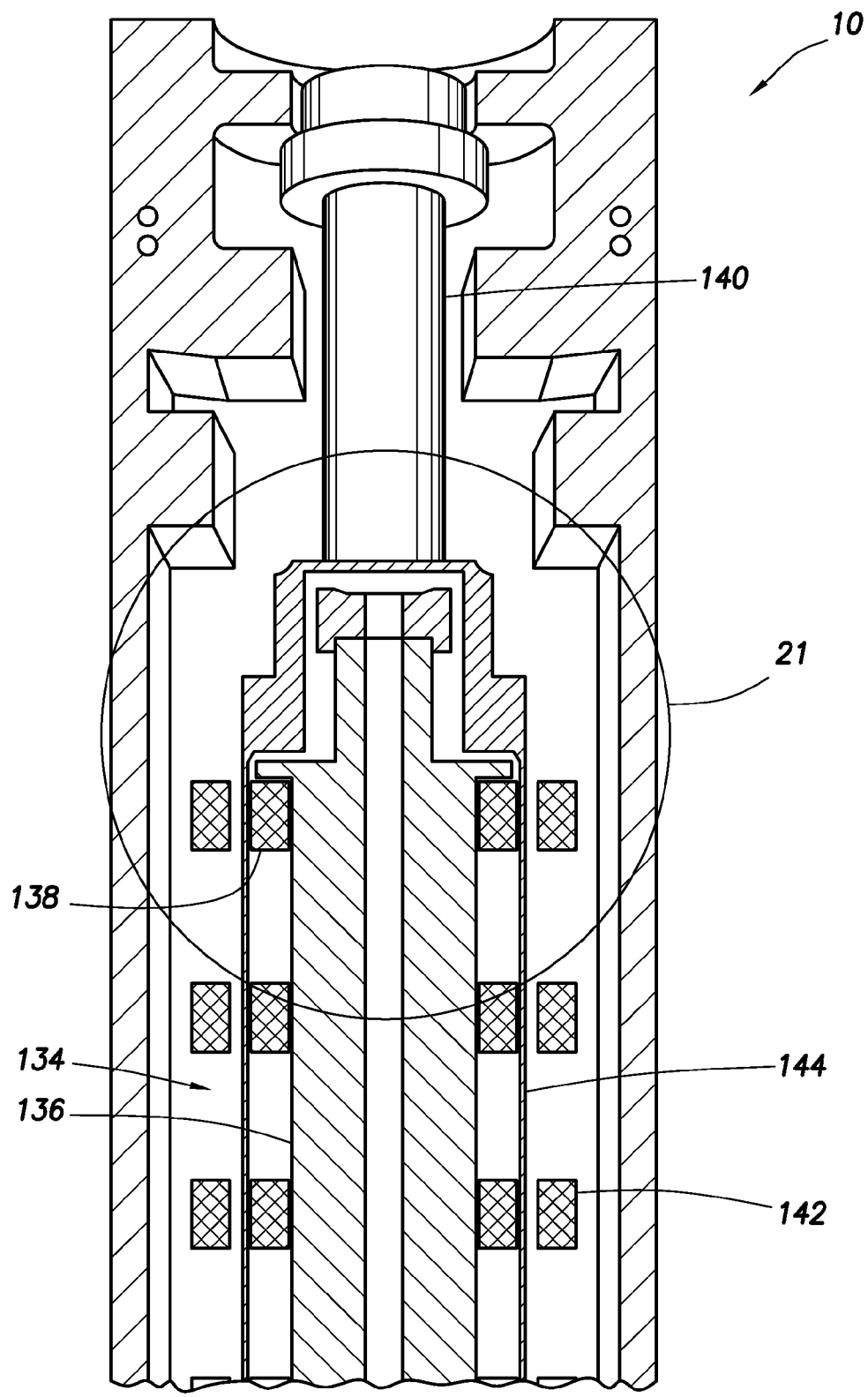

Referring additionally now to FIG. 6, another example of the well tool 10 is representatively illustrated. In this example, the well tool 10 is of the type well known to those skilled in the art as a downhole electric motor used to drive a submersible pump. A magnetic coupling 134 portion of the downhole electric motor, used to transmit torque from the motor to the pump, is depicted in FIG. 6.

A motor shaft 136 has magnets 138 mounted thereon, and a pump shaft 140 has magnets 142 connected thereto. The magnets 138, 142 are magnetically coupled to each other, so that torque is transmitted from the motor shaft 136 to the pump shaft 140. A thin-walled shell 144 isolates the motor from well fluids.

The rotating shafts 136, 140 are typically supported at ends of the assembly (and, in some examples, between the ends) by plain bearings. At an intermediate location (shown in an enlarged view in FIG. 21), bearings are used between the shafts 136, 140, the shell 144 and an outer housing 146. Bearings such as tilting-pad, lemon bore, offset bearings and any other types of bearings may be used.

When used to pump fluids downhole, the bearings can experience very high loads and vibration. The downhole electric motor of FIG. 6 is similar in many respects to that described in U.S. Pat. No. 6,863,124.

The principles of this disclosure can be used in all of the well tool 10 examples described above. In particular, the principles of this disclosure can be used to reduce contact pressure between bearing surfaces 32, 44 in the above well tool 10 examples, as well as in a variety of other well tools (such as, a roller cone drill bit, etc.).

Figure 7:
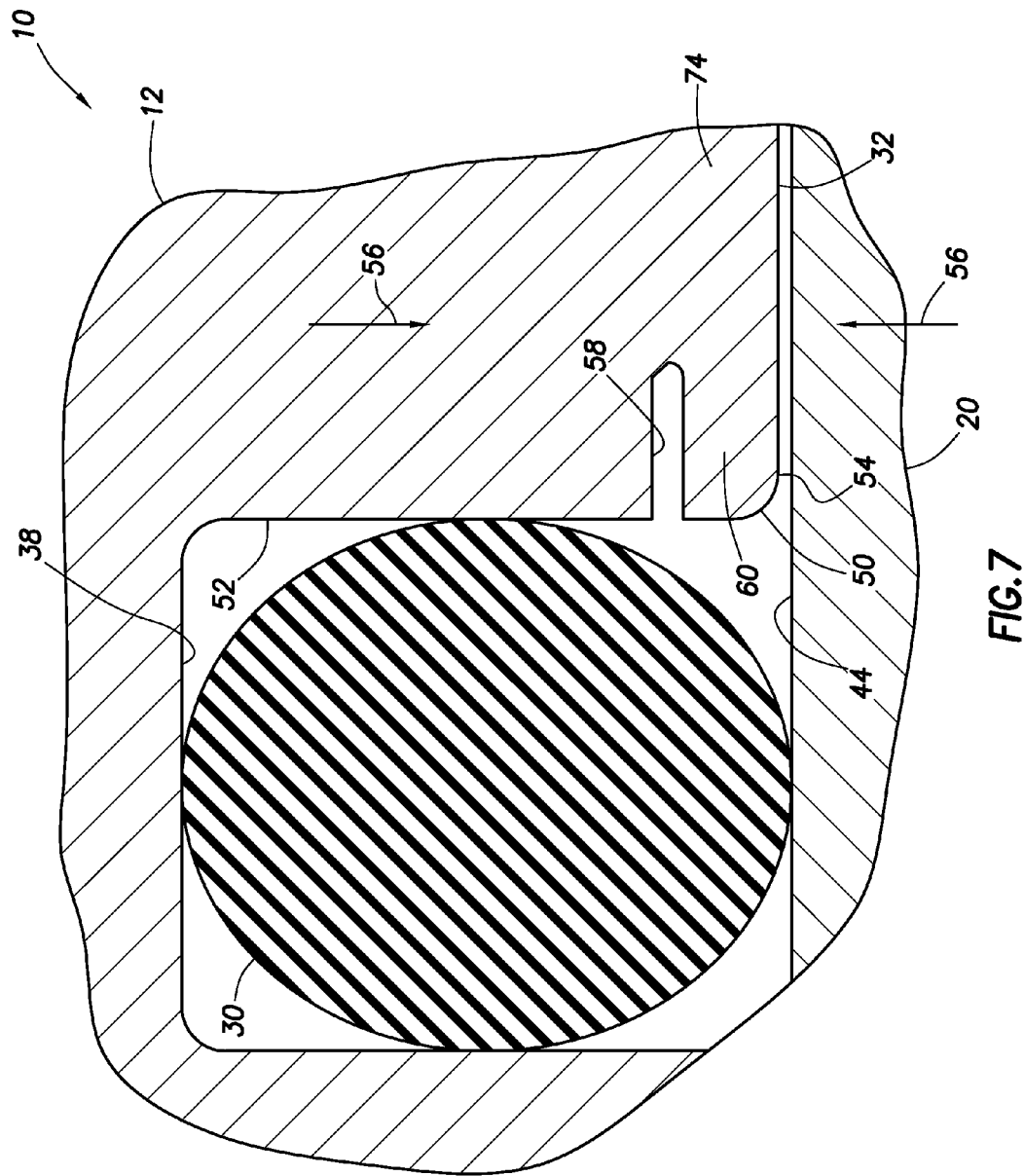
FIG. 7 is an enlarged scale schematic cross-sectional view of a portion of an interface between bearing surfaces of the well tool.

Referring additionally now to FIG. 7, an enlarged scale cross-sectional view of a seal groove 38 and adjacent bearing surfaces 32, 44 is representatively illustrated. The seal groove 38 is used herein as an example of a well tool 10 feature which can lead to a transition between contact and lack of contact between the bearing surfaces 32, 44. Other features of a well tool 10 can produce such a transition between contact and lack of contact, in keeping with the principles of this disclosure.

In the example of FIG. 7, it may be seen that a transition in the surface 32 occurs at a radius 50 formed between the surface and a side wall 52 of the groove 38. It has been discovered via modeling techniques that contact pressure between the surfaces 32, 44 is highly concentrated at the transition between the surface 32 and the side wall 52.

More specifically, the modeling techniques have revealed that, under certain circumstances, contact pressure near a tangent 54 (i.e., the transition between a) contact between the surfaces 32, 44 and b) lack of contact between the surfaces) can be many times the contact pressure away from the tangent. Note that, for clarity of illustration and description, the surfaces 32, 44 are depicted in FIG. 7 (and subsequent figures) as being spaced apart somewhat, but the surfaces would contact each other when forces 56 are being transmitted between the components 12, 20.

An analysis has also revealed that contact pressure on most of (e.g., ~90% of) the surface area of contact between the surfaces 32, 44 can be much less than (e.g., ~20% of) the contact pressure at the transition between the surface 32 and the side wall 52. This phenomenon is known as "edge loading" in the art of contact mechanics.

The underlying reason for this circumstance is the concentrated accumulation of strain energy in the structure of the component 12 adjacent the transition between the surface 32 and the side wall 52. If this strain energy could be relieved, the contact pressure at the transition could be reduced, resulting in the contact pressure being more evenly distributed across the area of contact between the surfaces 32, 44.

One technique for relieving the strain energy at the transition in the surface 32 is depicted in FIG. 7. Note that material has been removed from the component 12 to thereby form an annular recess 58 extending axially from the side wall 52. One of the beneficial results of the recess 58 is a reduction in the stiffness of the structure 60 adjacent the tangent 54.

This reduction in stiffness allows the structure 60 to flex somewhat, thereby relieving strain energy. That is, the strain energy in the structure 60 will be reduced relative to what the strain energy in the structure 60 would have been if it had been constructed similar to an adjacent structure 74 of the component 12 which does not have the recess 58 formed therein. Transmission of the forces 56 through the structure 60 will result in much greater deflection of the structure 60, as compared to deflection of the adjacent structure 74 due to transmission of the forces.

The recess 58 may be in the form of a groove, slit, depression, etc. In the example of FIG. 7, the recess 58 extends completely around in the structure 60, so that the stiffness of the structure is reduced circumferentially about the bearing surface 32. In other examples, the reduction in stiffness of a structure may not extend completely around the interior or exterior of the structure. Particularly where loading on the structure is typically from one direction (for example, in non-rotating elements), it may be desirable to reduce the stiffness of the structure only on one side of the structure.

Figure 8:
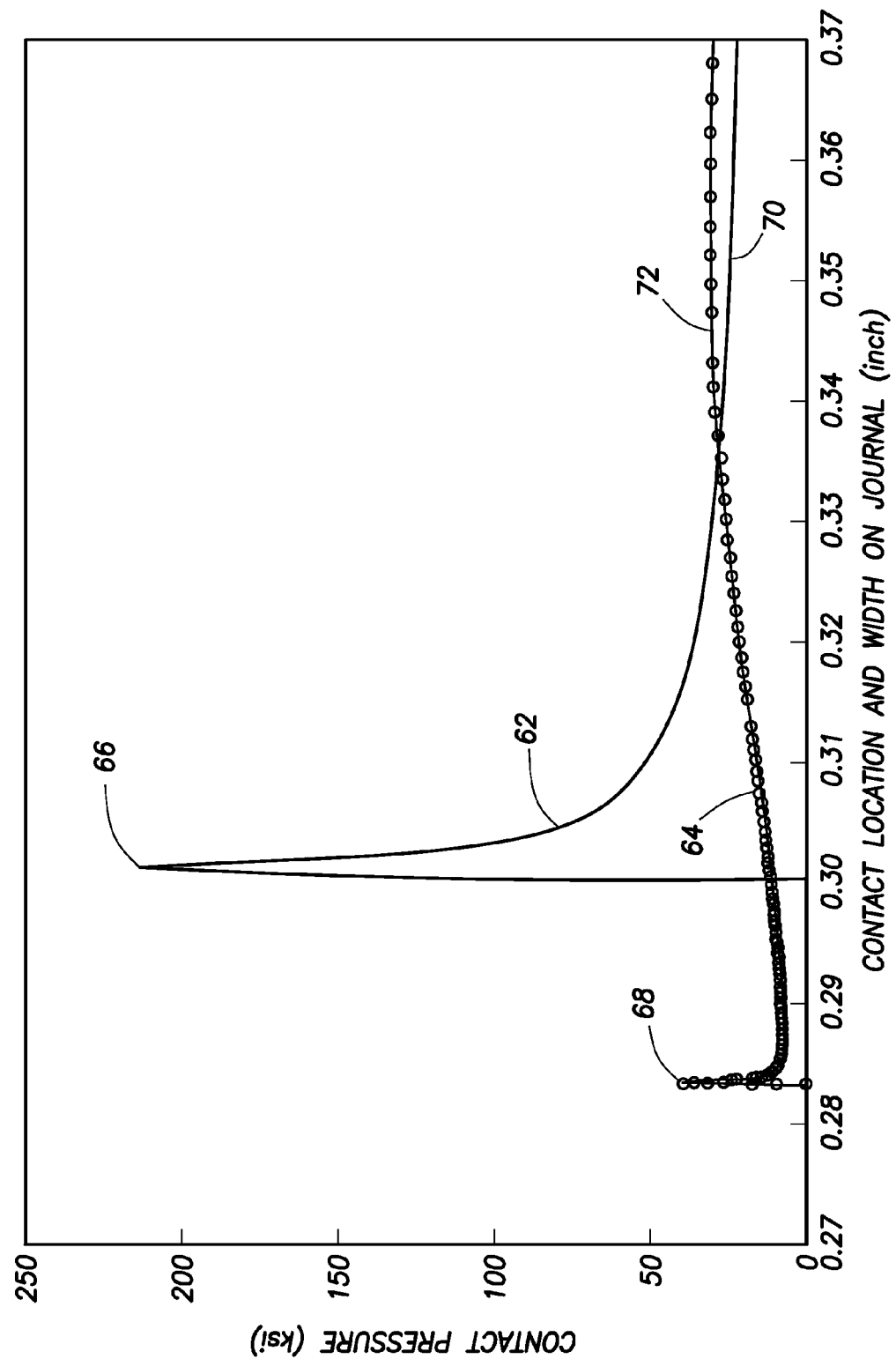
FIG. 8 is graph of modeled contact pressure versus distance along a bearing surface for modified and unmodified bearing surface interfaces.

In FIG. 8, a graph of contact pressure versus distance along the component 20 is representatively illustrated. This graph represents one of the results of the inventor's modeling efforts discussed above.

One curve 62 on the graph represents contact pressure along the component 20 with an unmodified component 12, that is, the component 12 without the recess 58 formed therein to reduce the stiffness of the structure 60. Another curve 64 on the graph represents contact pressure along the component 20 with the component 12 modified as described above to relieve the strain energy in the structure 60.

Note that the maximum contact pressure 66 for the unmodified component 12 is many times greater than the maximum contact pressure 68 for the modified component 12. A contact pressure 70 at the remainder of the bearing surfaces 32, 44 interface for the unmodified design (i.e., adjacent the relatively high stiffness structure 74) appears to be somewhat less than a contact pressure 72 at the remainder of the interface for the modified design, but both of these contact pressures 70, 72 are much less than the maximum contact pressure 66 for the unmodified design.

The maximum contact pressure 68 for the modified design at the transition on the surface 32 is only slightly more than the contact pressures 70, 72 at the remainder of the bearing surfaces 32, 44 interface, and is much less than the maximum contact pressure 66 for the unmodified design. Thus, it is expected that well tools constructed using the principles described in this disclosure will have much greater bearing longevity.

Figure 9:
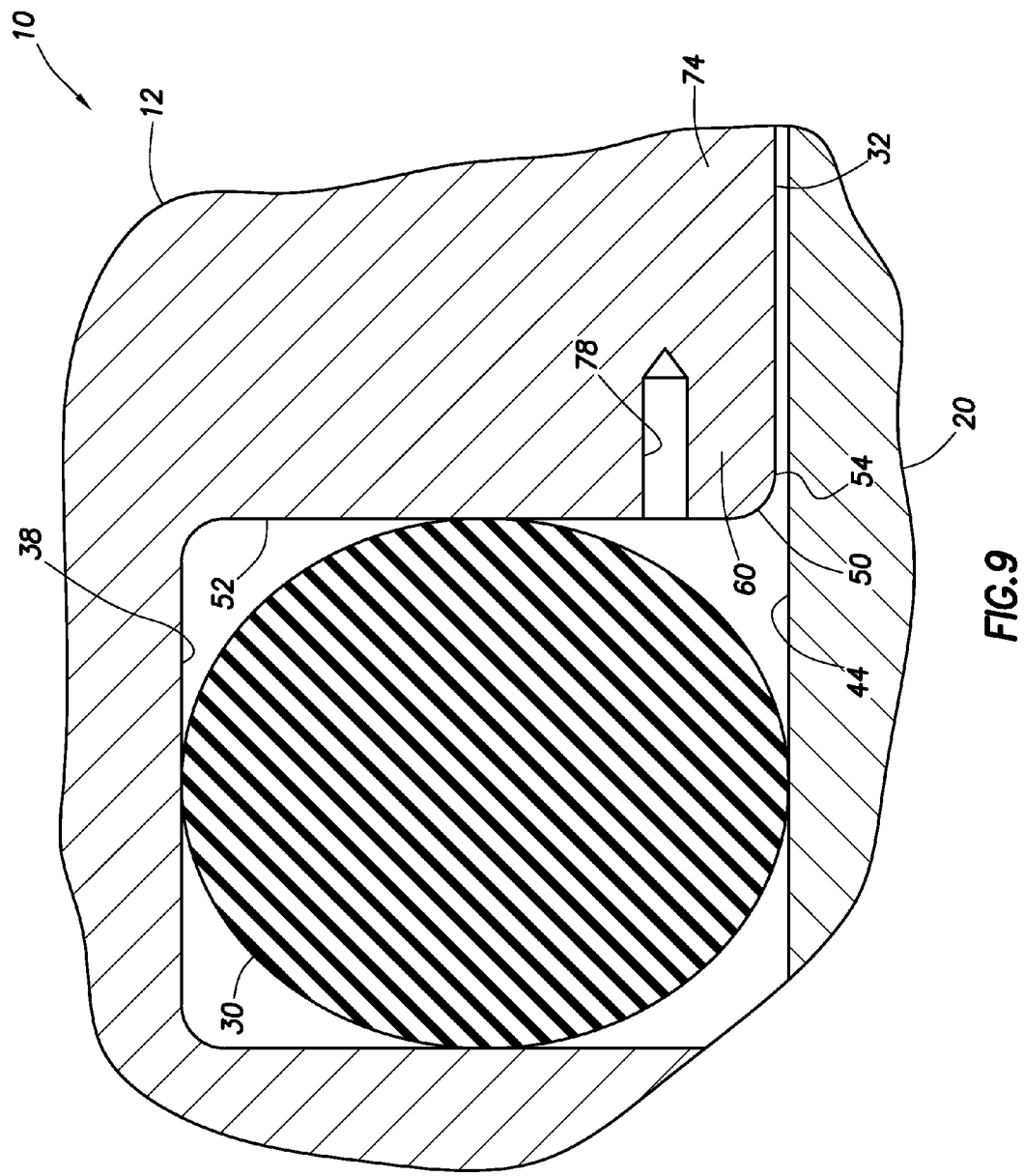
FIGS. 9-22 are schematic cross-sectional views of various strain energy-relieving configurations for interfaces between bearing surfaces.
Figure 10:
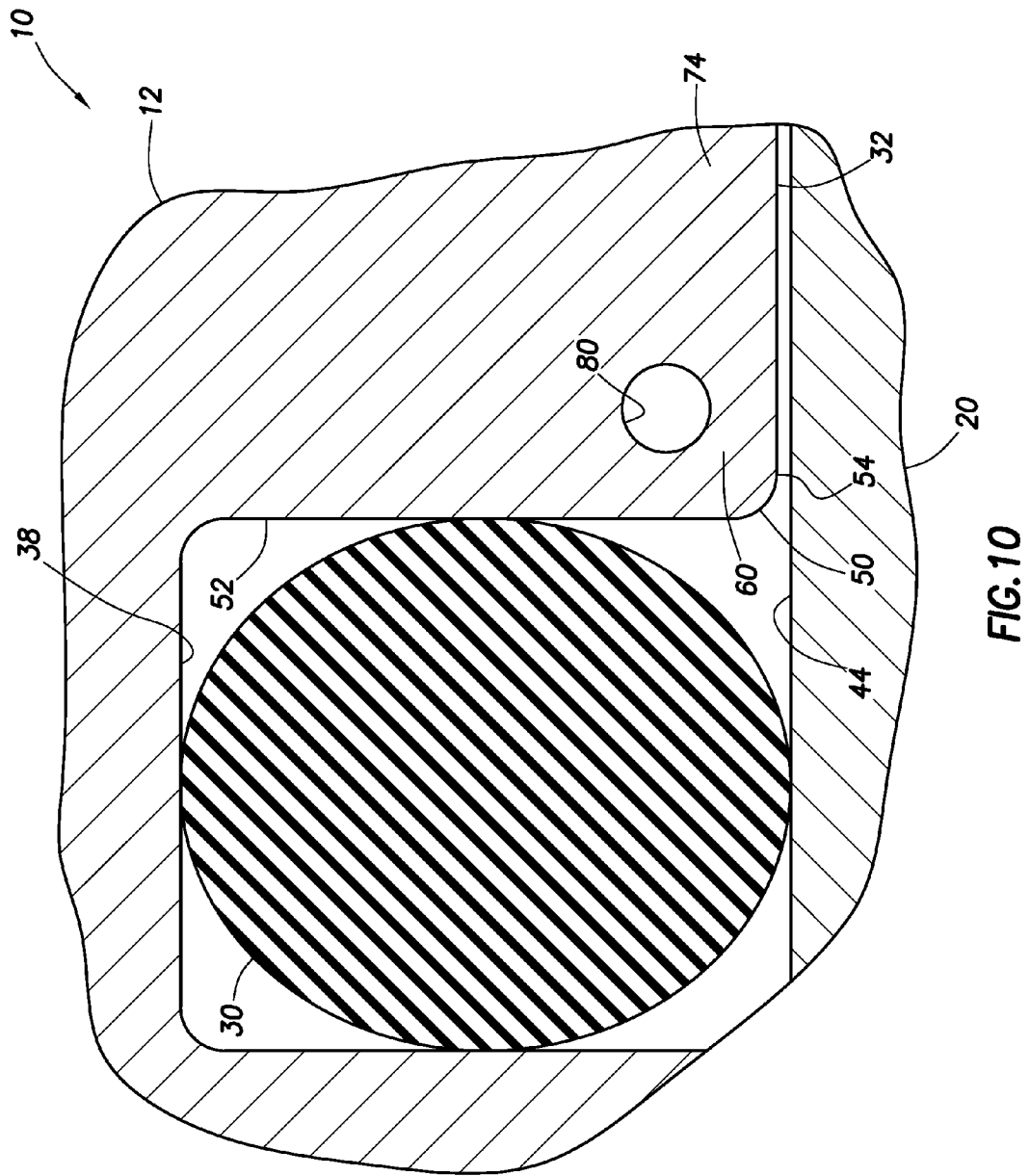
Figure 11:
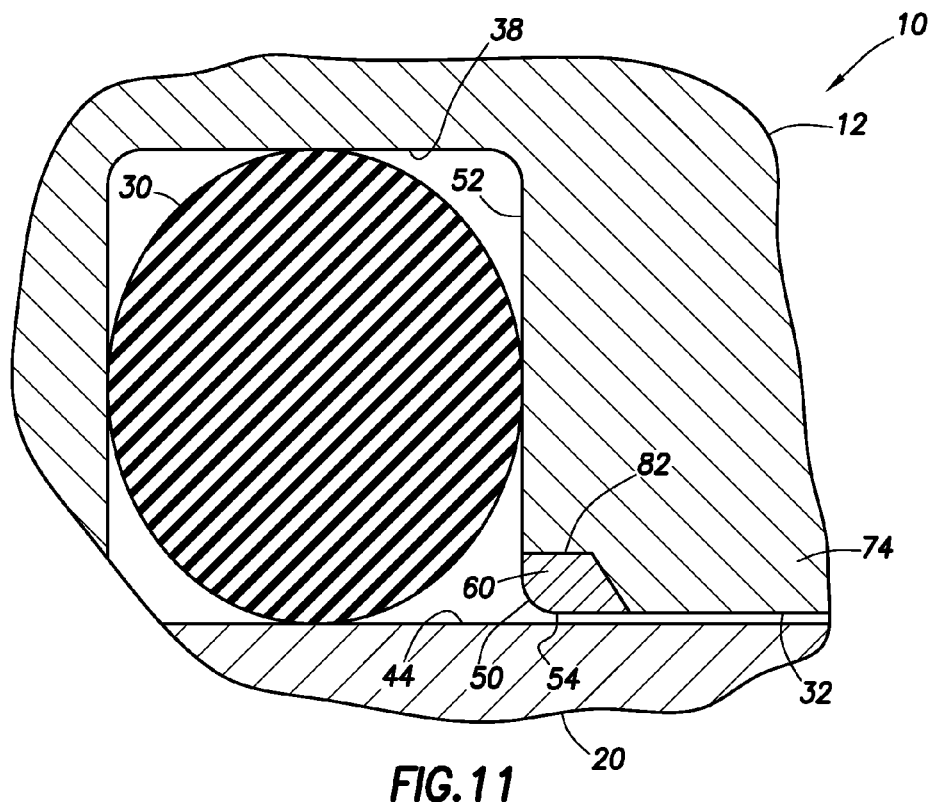
Figure 12:
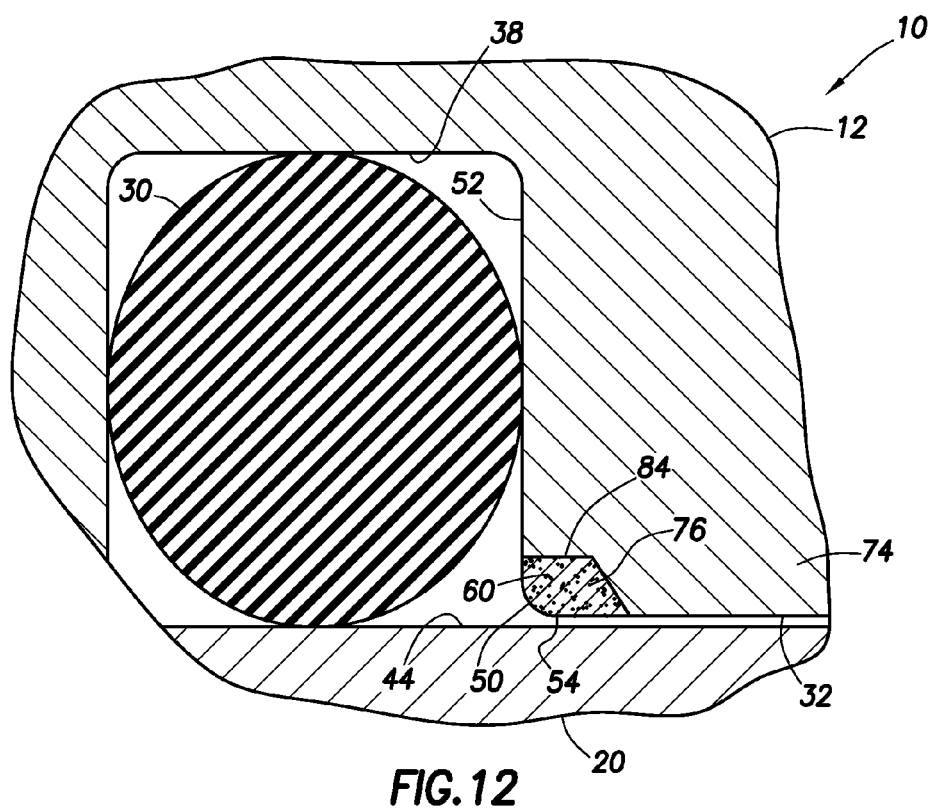

Although the recess 58 is depicted as being used in FIG. 7 for reducing the stiffness of the structure 60 adjacent the tangent 54 between the surfaces 32, 44, it should be understood that other means of reducing stiffness at transitions can be used, without departing from the principles of the present disclosure. These other means can be used to permit the structure 60 to distort near the transition (e.g., near the tangent 54) and thereby relieve strain energy and reduce contact pressure between the surfaces 32, 44. Such other means could include, for example, hole(s) 78 (see FIG. 9), void(s) 80 (see FIG. 10), reduced stiffness structure(s) 82 (see FIG. 11, wherein the reduced stiffness may be due to various features, such as, use of a reduced modulus material, lack of material, etc.), reduced elastic modulus material(s) 84 (see FIG. 12), etc., and any combination of contact pressure reducing means.

If a reduced elastic modulus material 84 is used, in some examples the elastic modulus of the material may vary gradually. Thus, the reduced elastic modulus material 84 may have "gradient" modulus properties. Such a gradient elastic modulus material or functionally gradient material 92 (see FIG. 15) can be used to smooth out a transition in stiffness, to thereby provide a gradual drop in contact pressure between the surfaces 32, 44.

The material 84 can incorporate nano structures 76 therein to provide the reduced elastic modulus of the material. As known to those skilled in the art, a nano structure is a structure having a maximum size of 100 nm. As used herein, the term "nano structure" can encompass nano particles, nano tubes, and any other structures having a size of 100 nm or less.

Figure 13:
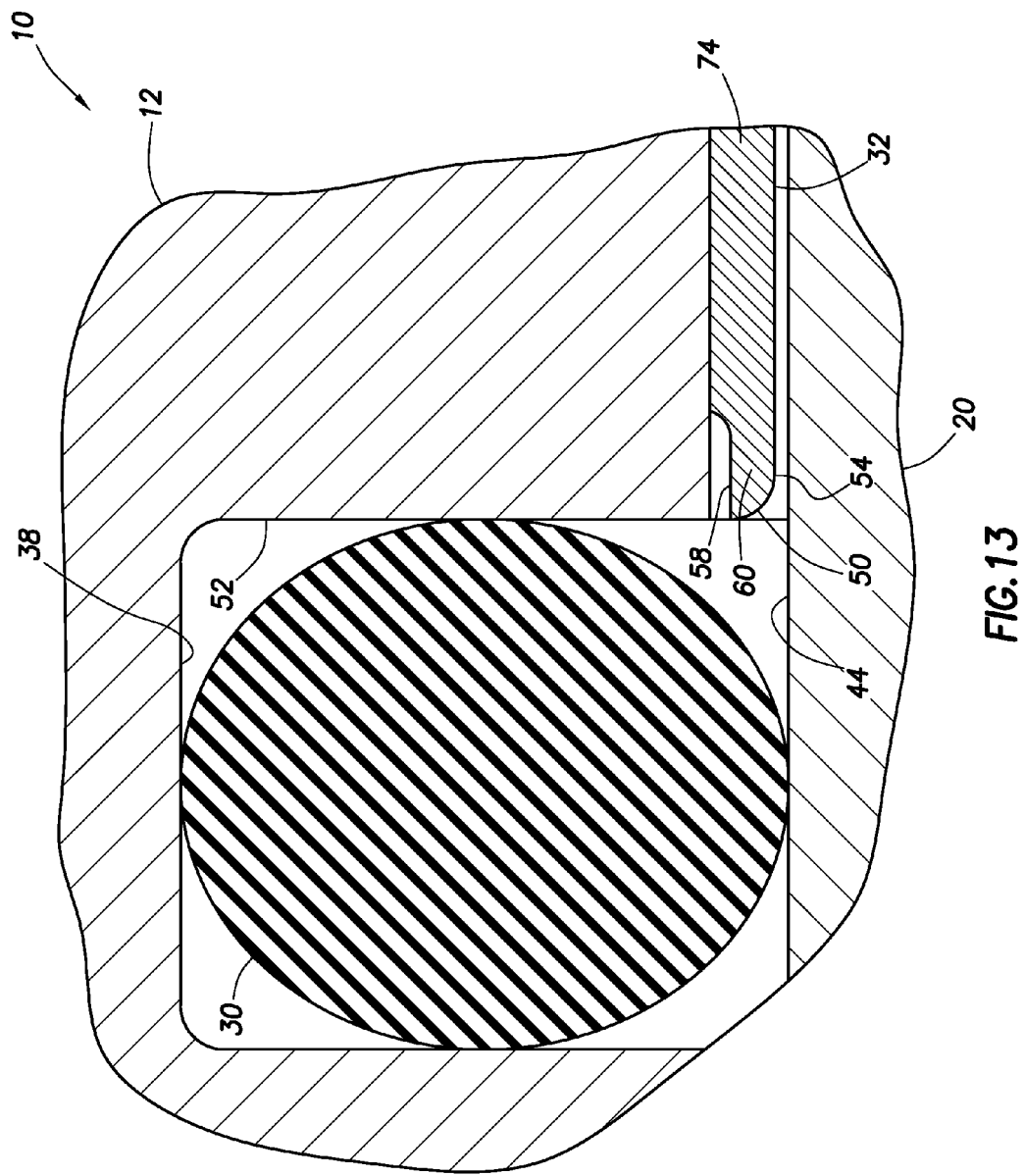

In FIG. 13, the structure 60 comprises a bearing sleeve which is interference fit within the component 12. Thus, the bearing surface 32 which contacts the bearing surface 44 is formed on an interior of the bearing sleeve. In this example, the bearing sleeve has the radius 50 formed thereon, so that a transition between contact and lack of contact between the bearing surfaces 32, 44 occurs at the tangent 54. The recess 58 is formed into the structure 60 to relieve strain energy at the transition between contact and lack of contact between the surfaces 32, 44. The recess 58 reduces the stiffness of the structure 60 supporting the surface 32 at the tangent 54, thereby reducing the maximum contact pressure between the surfaces 32, 44.

Figure 14:
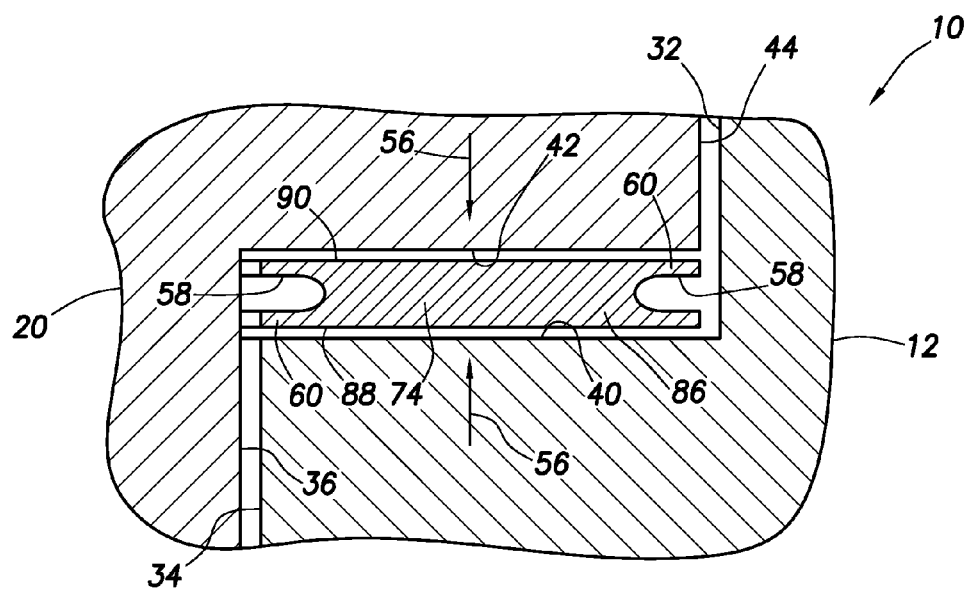

In FIG. 14, the structure 60 comprises a floating thrust bearing 86 disposed between bearing surfaces 40, 42 on the component 12 and the component 20. Note that the radius 50 is not formed on the structure 60 in this example, but the recess 58 still reduces the stiffness of the structure 60 at a transition between contact and lack of contact between the bearing surfaces 40, 42 and respective bearing surfaces 88, 90 on the thrust bearing 86.

The configuration of FIG. 14 demonstrates that the principles of this disclosure may be implemented even though the radius 50 and tangent 54 are not formed on the structure 60, and even though the structure is not part of the component 12. This example also demonstrates that the principles of this disclosure can be applied to various different types of bearing surfaces.

The thrust bearing 86 may be used in any of the well tool 10 examples representatively illustrated in FIGS. 1-6, as well as in any other types of well tools. For example, the thrust bearing 86 could be used in a roller cone drill bit.

The thrust bearing 86 could utilize any of the techniques described herein for reducing contact pressure between bearing surfaces. For example, nano structures 76, holes 78, voids 80, reduced modulus materials 84, functionally gradient materials 92, multiple materials 160, 162, etc. could be used in the thrust bearing 86, if desired.

The recess 58 is depicted in FIGS. 7, 13 & 14 as being annular-shaped. However, other shapes could be used in keeping with the principles of this disclosure. The above disclosure describes reducing stiffness of the structure 60 supporting the surface 32, but it should be clearly understood that the principles of this disclosure can be used for reducing the stiffness of any structure supporting any bearing surfaces, or any combination of bearing surfaces.

Although the principles of this disclosure have been described above as being used to reduce contact pressure at the interface between the bearing surfaces 32, 44 near the tangent 54 (e.g., at a transition between contact and lack of contact between the bearing surfaces), those principles can be applied at other locations in the well tool 10. Other features of the well tool 10 can cause a transition between contact and lack of contact between the bearing surfaces 32, 44.

The above disclosure describes reducing the stiffness of the structure 60 supporting the bearing surface 32 on the component 12. However, the principles of this disclosure can also, or alternatively, be used to reduce the stiffness of structures supporting bearing surface 44 on the component 20. In addition, it is not necessary for the reduction in stiffness to extend completely around the component 20, since maximum contact pressure may be typically experienced on only one side of the component.

Figure 15:
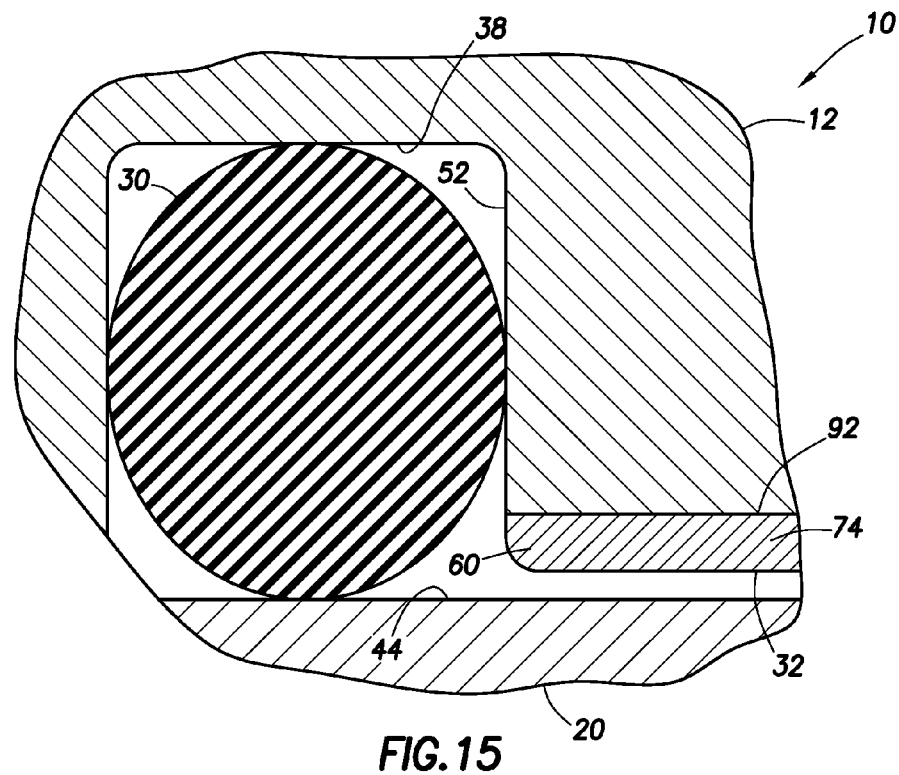

Referring additionally now to FIG. 15, another configuration of the well tool 10 is representatively illustrated, in which a functionally gradient material 92 provides a reduced stiffness to the structure 60 and an increased stiffness to the structure 74. The material 92 may have a reduced modulus at the structure 60 and an increased modulus at the structure 74, thereby providing for reduced contact pressure at the transition between contact and lack of contact between the bearing surfaces 32, 44. In that case, the functionally gradient material 92 could also be a graduated modulus material (e.g., a material having a modulus which gradually changes in a selected direction).

Figure 16:
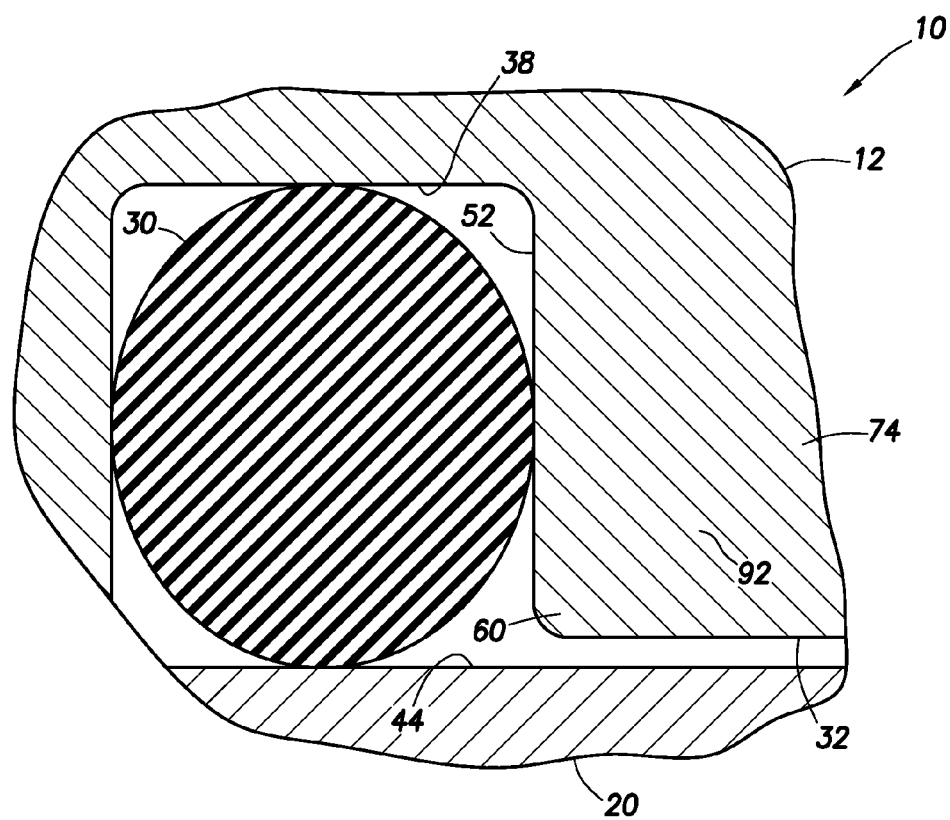

Referring additionally now to FIG. 16, another configuration of the well tool 10 is representatively illustrated, in which the component 12 has the functionally gradient material 92 incorporated therein, so that there is a gradual transition from the reduced stiffness structure 60 to the increased stiffness structure 74 in the component itself. This will result in reduced contact pressure at the transition between contact and lack of contact between the bearing surfaces 32, 44. The functionally gradient material 92 could also, or alternatively, be incorporated into the component 20, if desired.

Figure 17:
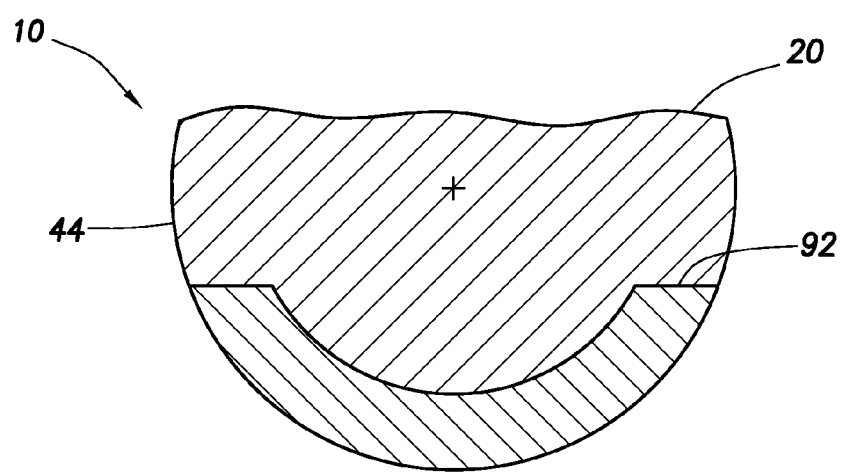

Referring additionally now to FIG. 17, a cross-sectional view of the component 20 is representatively illustrated for yet another configuration of the well tool 10. In this configuration, the functionally gradient material 92 is used on a lower side of the component 20 bearing surface 44. In some examples, this side of the component 20 may receive the maximum contact pressure due to forces applied to the component, and so it may be desirable to only utilize the functionally gradient material 92 on the lower side where it would be most advantageous for reducing contact pressure between the bearing surfaces 44, 32.

In the configurations of FIGS. 15-17, the functionally gradient material 92 can reduce contact pressure between the bearing surfaces 32, 44 at the transition between contact and lack of contact between the bearing surfaces 32, 44. This is due to the material 92 providing a reduced stiffness in the structure 60 and an increased stiffness in the structure 74. For example, the material 92 may have a reduced modulus at the structure 60 and an increased modulus at the structure 74, thereby providing for reduced contact pressure at the transition between contact and lack of contact between the bearing surfaces 32, 44.

Figure 22:
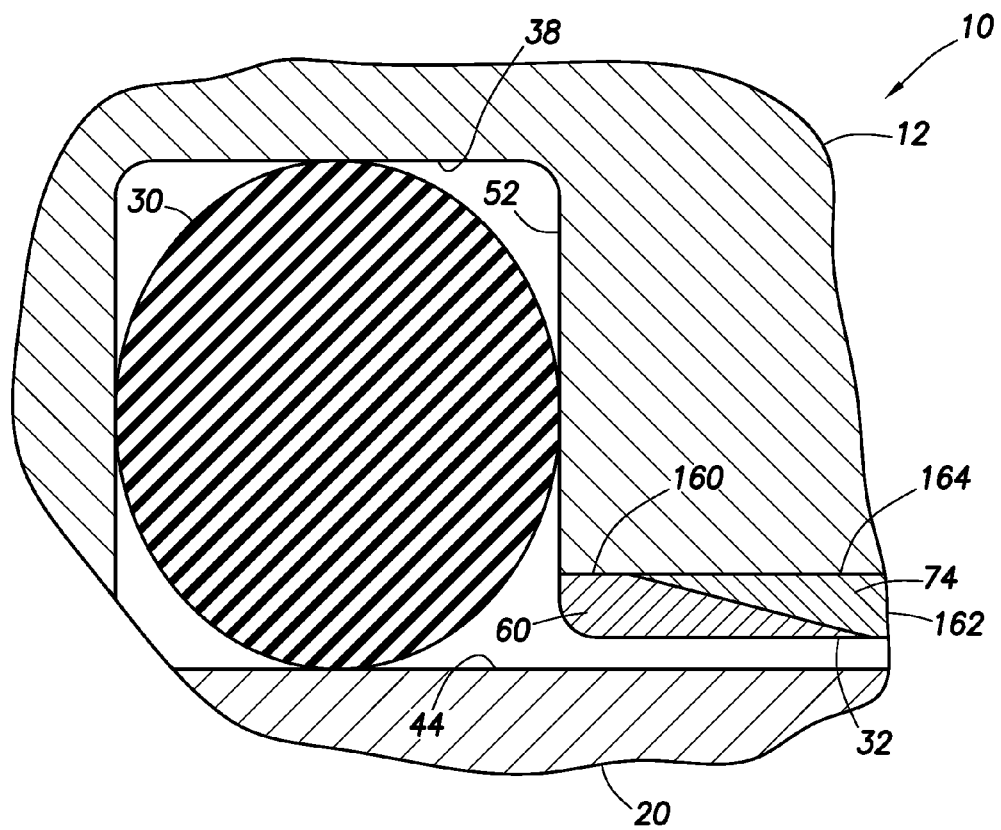

Such a change in stiffness and/or modulus can be accomplished in other ways, in keeping with the principles of this disclosure. In one example depicted in FIG. 22, multiple materials 160, 162 could be used, with one material 160 having a reduced stiffness and/or modulus in the structure 60, and another material 162 having an increased stiffness and/or modulus in the structure 74. The transition from the first material 160 to the second material 162 could be gradual (such as, by tapering from one to the other as depicted in FIG. 22), and could be provided in a separate bearing sleeve 164 or as part of either or both of the components 12, 20. For example, the material 160 could be a less rigid material (such as silver, etc.) and the material 162 could be a more rigid material (such as hardened steel, etc.).

Figure 18:
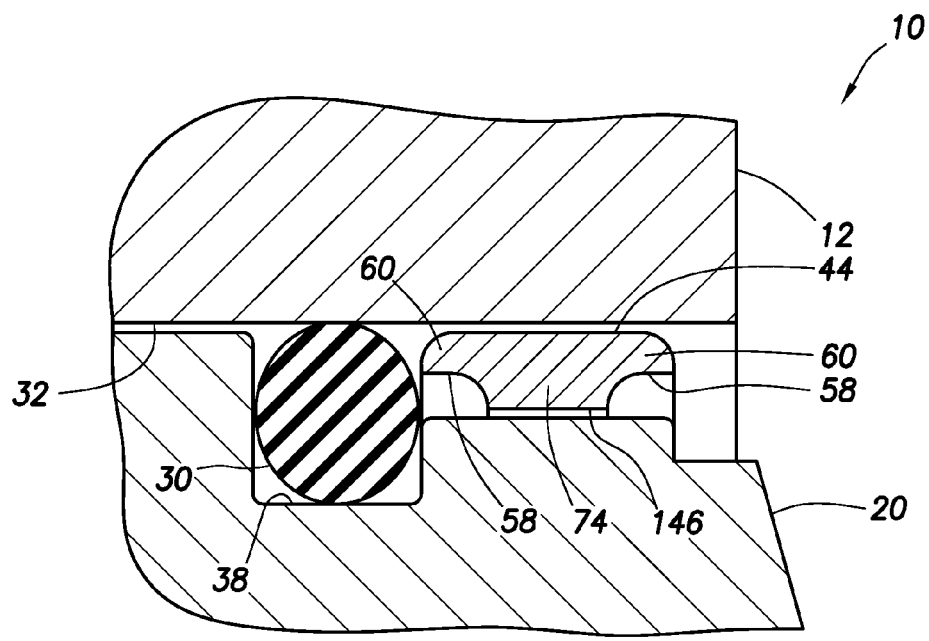

Referring additionally now to FIG. 18, an enlarged scale cross-sectional view of the well tool 10 example of FIG. 3 is representatively illustrated, demonstrating how the principles of the present disclosure may be used to reduce contact pressure between the piston component 20 and the structural component 12. Note that a bearing sleeve 146 is preferably press-fit or shrink-fit onto the piston component 20.

The bearing sleeve 146 has the recesses 58 formed therein to thereby reduce a stiffness of structures 60 at opposite ends of the bearing sleeve. This reduces the contact pressure between the bearing surfaces 32, 44 at the opposite ends of the bearing sleeve 146, where a transition occurs between contact and lack of contact between the bearing surfaces.

Note that any of the other techniques described above (such as, use of nano structures 76, holes 78, voids 80, reduced modulus materials 84, functionally gradient materials 92, multiple materials 160, 162, etc.) may also, or alternatively, be used to reduce contact pressure between the bearing surfaces 32, 44 in the example of FIGS. 3 and 18, if desired.

Figure 19:
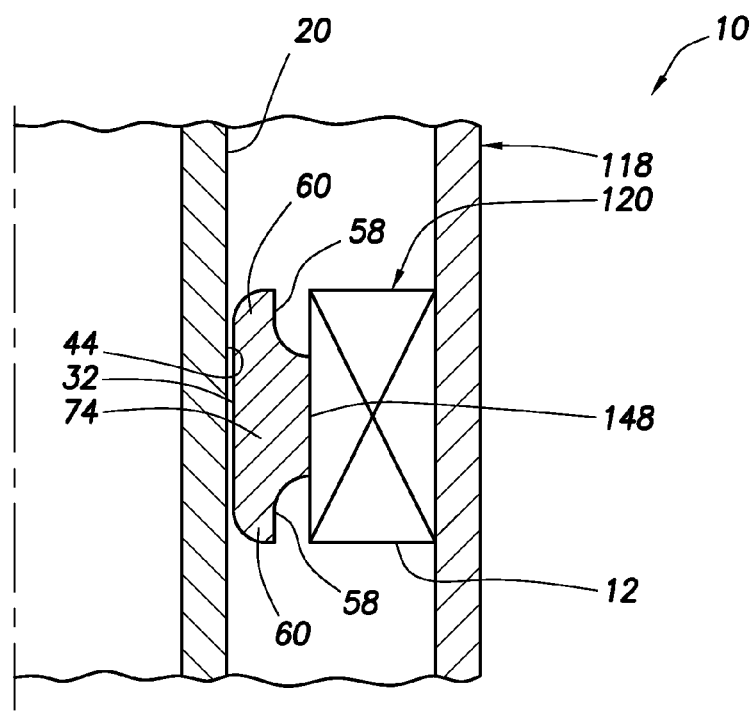

Referring additionally now to FIG. 19, an enlarged scale cross-sectional view of the well tool 10 example of FIG. 4 is representatively illustrated, demonstrating how the principles of the present disclosure may be used to reduce contact pressure between the shaft component 20 and the cantilever bearing component 12. Note that a bearing sleeve 148 is interposed between the components 12, 20.

The bearing sleeve 148 has the recesses 58 formed therein to thereby reduce a stiffness of structures 60 at opposite ends of the bearing sleeve. This reduces the contact pressure between the bearing surfaces 32, 44 at the opposite ends of the bearing sleeve 148, where a transition occurs between contact and lack of contact between the bearing surfaces.

Note that any of the other techniques described above (such as, use of nano structures 76, holes 78, voids 80, reduced modulus materials 84, functionally gradient materials 92, multiple materials 160, 162, etc.) may also, or alternatively, be used to reduce contact pressure between the bearing surfaces 32, 44 in the example of FIGS. 4 and 19, if desired.

Figure 20:
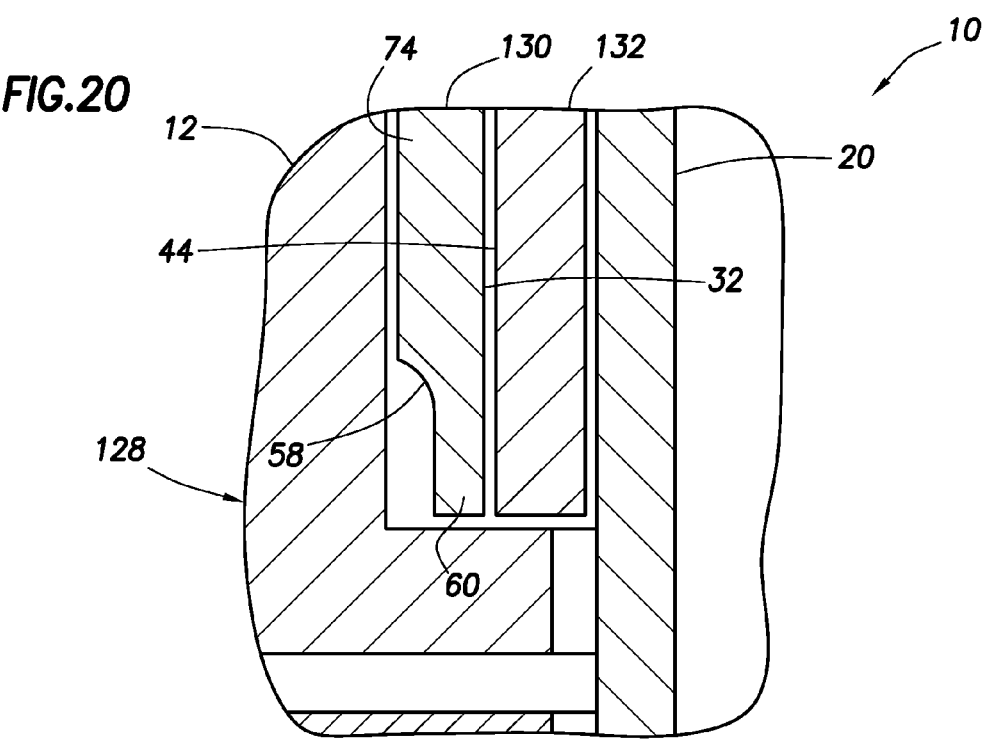

Referring additionally now to FIG. 20, an enlarged scale cross-sectional view of the well tool 10 example of FIG. 5 is representatively illustrated, demonstrating how the principles of the present disclosure may be used to reduce contact pressure between the bearing sleeves 130, 132 of the respective components 12, 20.

The bearing sleeve 130 has the recesses 58 formed therein to thereby reduce a stiffness of structure 60 at a lower end of the bearing sleeve. This reduces the contact pressure between the bearing surfaces 32, 44 at the lower end of the bearing sleeve 130, where a transition occurs between contact and lack of contact between the bearing surfaces.

Note that any of the other techniques described above (such as, use of nano structures 76, holes 78, voids 80, reduced modulus materials 84, functionally gradient materials 92, multiple materials 160, 162, etc.) may also, or alternatively, be used to reduce contact pressure between the bearing surfaces 32, 44 in the example of FIGS. 5 and 20, if desired.

Figure 21:
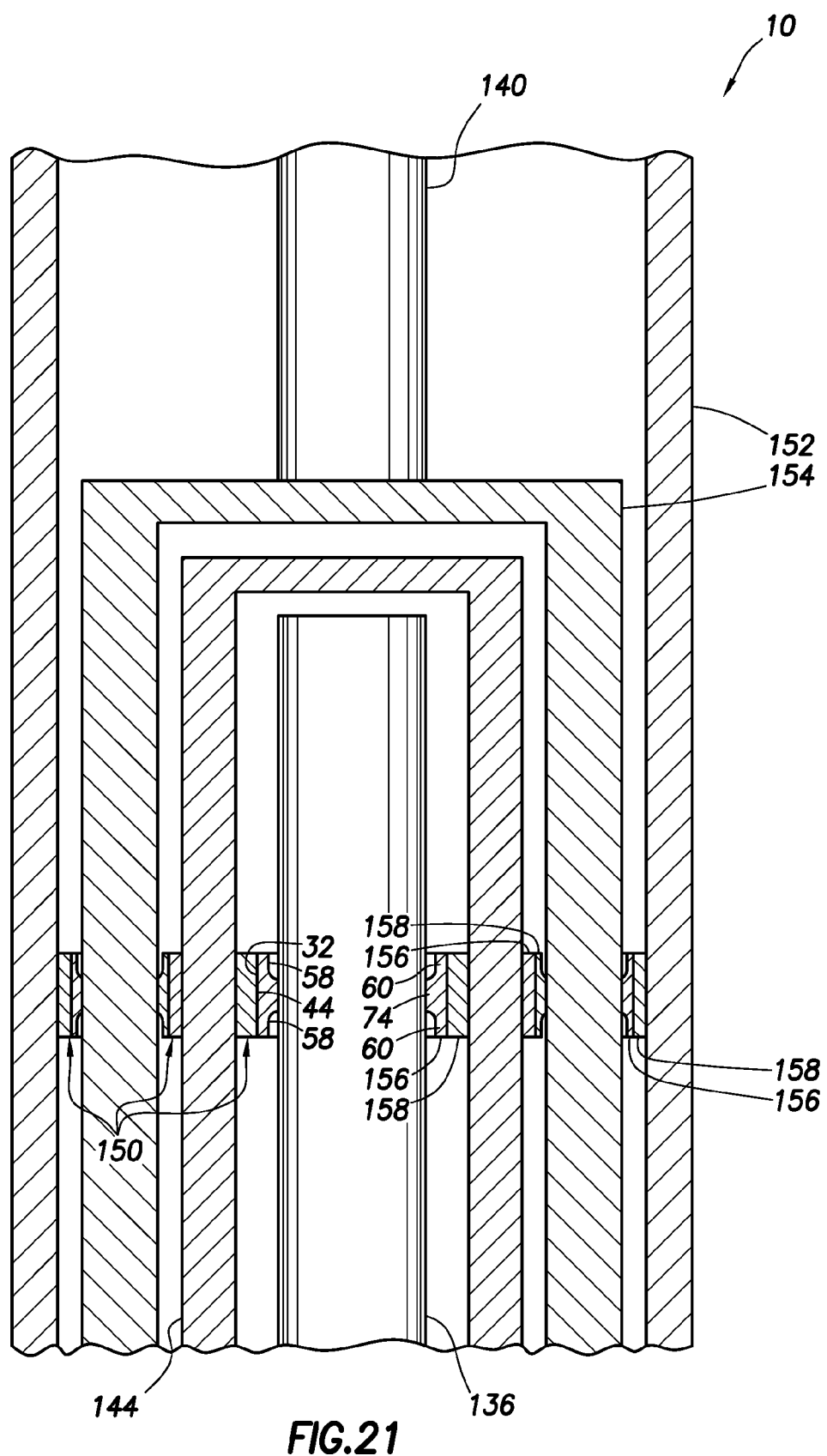

Referring additionally now to FIG. 21, an enlarged scale cross-sectional view of the well tool 10 example of FIG. 6 is representatively illustrated, demonstrating how the principles of the present disclosure may be used to reduce contact pressure in journal bearings 150. The journal bearings 150 are used to provide support and reduce friction between an outer housing 152 and a rotor 154 on the pump shaft 140, between the rotor 154 and the thin-walled shell 144, and between the shell 144 and the motor shaft 136.

Each journal bearing 150 includes an inner bearing sleeve 156 and an outer bearing sleeve 158. The recesses 58 are formed on the inner and/or outer bearing sleeves 156, 158 to thereby reduce a stiffness of structures 60 at opposite ends of the bearing sleeve. This reduces the contact pressure between the bearing surfaces 32, 44 at the ends of the bearing sleeves 156 and/or 158, where a transition occurs between contact and lack of contact between the bearing surfaces.

Note that any of the other techniques described above (such as, use of nano structures 76, holes 78, voids 80, reduced modulus materials 84, functionally gradient materials 92, multiple materials 160, 162, etc.) may also, or alternatively, be used to reduce contact pressure between the bearing surfaces 32, 44 in the example of FIGS. 5 and 20, if desired.

It may now be fully appreciated that the above disclosure provides several advancements to the art of reducing contact pressures in well tools. The principles of this disclosure result in dramatic reductions in maximum contact pressure between bearing surfaces, and can do so without requiring that any additional components be added to the equipment, and without requiring that extensive redesign be implemented.

The principles of this disclosure can be applied in-situ in a non-intrusive manner in some examples. The resulting structures can also be easily inspected for conformance to specifications.

Due to the reduced maximum contact pressure, a variety of different types of lubricants can be used between the bearing surfaces 32 and 44, 88 and 40, 90 and 42. For example, oil could be used as a lubricant, instead of conventional grease.

The above disclosure provides to the art a method of reducing contact pressure between first and second bearing surfaces 32, 44 of a well tool 10. The method can include constructing a structure 60 which supports the first bearing surface 32 in contact with the second bearing surface 44; and reducing contact pressure between the first and second bearing surfaces 32, 44 by relieving strain energy in the structure 60.

The well tool 10 may comprise a rotary steerable device, a wellbore reamer, a fluid motor, a downhole electrical motor, or any other type of well tool.

The reduced contact pressure may be due to a lack of material supporting the structure 60 in the contacting step. The lack of material may be disposed adjacent a wall 52 of a seal groove 38. The lack of material may be selected from one or more of the group consisting of a recess 58, a hole 78 and a void 80. Constructing the structure 60 may include positioning the structure 60 between the lack of material and the first bearing surface 32.

The reduced contact pressure may be due to a reduced stiffness of the structure 60 and/or a reduced elastic modulus material 84 of the structure.

The structure 60 may comprise a functionally gradient material 92. The structure 60 may comprise a graduated elastic modulus material 92. The structure 60 may comprise nano structures 76 therein. The structure 60 may comprise a first material 160 having a reduced stiffness relative to a second material 162 which supports the first bearing surface 32 in contact with the second bearing surface 44.

A well tool 10 described by the above disclosure may include a first bearing surface 32 which contacts a second bearing surface 44, a transition between contact and lack of contact between the first and second bearing surfaces 32, 44 and a structure 60 which supports one of the first and second bearing surfaces 32, 44. The structure 60 has a reduced stiffness, whereby a contact pressure between the first and second bearing surfaces 32, 44 is reduced at the transition due to deflection of the structure 60.

The transition may be located at a tangent 54 formed on the first bearing surface 32. The transition may be positioned adjacent a wall 52 of a seal groove 38.

The reduced stiffness of the structure 60 may be due to a lack of material supporting the structure 60. The lack of material may be disposed adjacent a wall 52 of a seal groove 38. The lack of material may be selected from one or more of the group consisting of a recess 58, a hole 78 and a void 80.

The reduced stiffness of the structure 60 may be due to a reduced elastic modulus material 84 of the structure 60.

The deflection of the structure 60 when forces 56 are transmitted between the first and second bearing surfaces 32, 44 may be increased due to the reduced stiffness of the structure 60.

The structure 60 may comprise a functionally gradient material 92, and preferably, a graduated elastic modulus material 92. The structure 60 may comprise nano structures 76 therein.

The well tool 10 may comprise a rotary steerable device, with the first and second bearing surfaces 32, 44 being formed on components 12, 20 of the rotary steerable device.

The well tool 10 may comprise a wellbore reamer, with the first and second bearing surfaces 32, 44 being formed on components 12, 20 of the wellbore reamer.

The well tool 10 may comprise a fluid motor, with the first and second bearing surfaces 32, 44 being formed on components 12, 20 of the fluid motor.

The well tool 10 may comprise a downhole electrical motor, with the first and second bearing surfaces 32, 44 being formed on components 12, 20 of the downhole electrical motor.

The structure 60 may comprise a first material 160 having a reduced stiffness relative to a second material 162 which supports the one of the first and second bearing surfaces 32, 44.

Also described by the above disclosure is a well tool 10 which includes a thrust bearing 86 interposed between components 12, 20 of the well tool 10. A first bearing surface 88 on the thrust bearing 86 contacts a second bearing surface 40 on at least one of the components 12, 20.

There is a transition between contact and lack of contact between the first and second bearing surfaces 88, 40. A structure 60 supports the first bearing surface 88, and the structure 60 has a reduced stiffness, whereby a contact pressure between the first and second bearing surfaces 88, 40 is reduced at the transition.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of reducing contact pressure between first and second cylindrical bearing surfaces of a well tool, the method comprising:

forming the first cylindrical bearing surface on one of an internal surface and an external surface of a bearing, the bearing permitting rotation of a well tool component which extends radially outward from an interface between the first and second cylindrical bearing surfaces;

forming the second cylindrical bearing surface on the other of the internal surface and the external surface of the bearing;

constructing a structure which supports the first cylindrical bearing surface in contact with the second cylindrical bearing surface, the structure including a material having a reduced elastic modulus which allows the first cylindrical bearing surface to deform in response to a concentrated accumulation of strain energy in the structure; and deforming the first cylindrical bearing surface, thereby distributing the strain energy across the first cylindrical bearing surface and reducing the contact pressure between the first and second cylindrical bearing surfaces.

2. The method of claim 1, wherein the well tool comprises a rotary steerable device.

3. The method of claim 1, wherein the well tool comprises a wellbore reamer.

4. The method of claim 1, wherein the well tool comprises a fluid motor.

5. The method of claim 1, wherein the well tool comprises a downhole electrical motor.

6. The method of claim 1, wherein the material is disposed adjacent a wall of a seal groove.

7. The method of claim 1, wherein the reduced contact pressure is due to a reduced stiffness of the structure.

8. The method of claim 1, wherein the structure comprises a functionally gradient material.

9. The method of claim 1, wherein the structure comprises a graduated elastic modulus material.

10. The method of claim 1, wherein the structure comprises nano structures therein.

11. The method of claim 1, wherein the structure comprises a first material having a reduced stiffness relative to a second material which supports the first cylindrical bearing surface in contact with the second cylindrical bearing surface.

12. The method of claim 1, wherein the well tool comprises a roller cone drill bit.

13. A well tool, comprising:
a first cylindrical bearing surface which contacts a second cylindrical bearing surface;
a component which extends radially outward from and rotates about an interface between the first and second cylindrical bearing surfaces;
a transition between contact and lack of contact between the first and second cylindrical bearing surfaces; and
a structure which supports one of the first and second cylindrical bearing surfaces, the structure having a reduced stiffness due to a reduced elastic modulus material within a portion of the structure, wherein a contact pressure between the first and second cylindrical bearing surfaces is reduced at the transition due to deformation of at least one of the first and second cylindrical bearing surfaces.

14. The well tool of claim 13, wherein the transition is at a tangent formed on the first cylindrical bearing surface.

15. The well tool of claim 13, wherein the transition is positioned adjacent a wall of a seal groove.

16. The well tool of claim 13, wherein the material is disposed adjacent a wall of a seal groove.

17. The well tool of claim 13, wherein the deformation of the at least one of the first and second cylindrical bearing surfaces occurs due to the reduced stiffness of the structure.

18. The well tool of claim 13, wherein the structure comprises a functionally gradient material.

19. The well tool of claim 13, wherein the structure comprises a graduated elastic modulus material.

20. The well tool of claim 13, wherein the structure comprises nano structures therein.

21. The well tool of claim 13, wherein the well tool comprises a rotary steerable device, the first and second cylindrical bearing surfaces being formed on components of the rotary steerable device.

22. The well tool of claim 13, wherein the well tool comprises a wellbore reamer, the first and second cylindrical bearing surfaces being formed on components of the wellbore reamer.

23. The well tool of claim 13, wherein the well tool comprises a fluid motor, the first and second cylindrical bearing surfaces being formed on components of the fluid motor.

24. The well tool of claim 13, wherein the well tool comprises a downhole electrical motor, the first and second cylindrical bearing surfaces being formed on components of the downhole electrical motor.

25. The well tool of claim 13, wherein the structure comprises a first material having a reduced stiffness relative to a second material which supports the one of the first and second cylindrical bearing surfaces.

26. The well tool of claim 13, wherein the well tool comprises a roller cone drill bit, the first and second bearing surfaces being formed on components of the roller cone drill bit.

27. A well tool, comprising:
an annular thrust bearing interposed between components of the well tool, the thrust bearing including first and second annular bearing surfaces, the first bearing surface opposing the second bearing surface in a direction of thrust, and the first and second bearing surfaces being annular about a longitudinal central axis of the well tool;
a transition between contact and lack of contact between the first and second bearing surfaces; and
a structure which supports the first bearing surface, the structure having a reduced stiffness due to a reduced elastic modulus material within a portion of the structure, wherein a contact pressure between the first and second bearing surfaces is reduced at the transition due to deformation of the first bearing surface.

28. The well tool of claim 27, wherein the deformation of the first bearing surface occurs due to the reduced stiffness of the structure.

29. The well tool of claim 27, wherein the structure comprises a functionally gradient material.

30. The well tool of claim 27, wherein the structure comprises a graduated elastic modulus material.

31. The well tool of claim 27, wherein the structure comprises nano structures therein.

32. The well tool of claim 27, wherein the structure comprises a first material having a reduced stiffness relative to a second material which supports the first bearing surface.

33. The well tool of claim 27, wherein the well tool comprises a roller cone drill bit.

34. A method of reducing contact pressure between first and second cylindrical bearing surfaces of a well tool, the method comprising:
forming the first cylindrical bearing surface on one of an internal surface and an external surface of a linear bearing, the linear bearing permitting a component of the well tool to slidingly displace from a first axial position to a second axial position when the well tool is actuated and to slidingly return to the first axial position when actuation ceases;
forming the second cylindrical bearing surface on the other of the internal surface and the external surface of the linear bearing;
constructing a structure which supports the first cylindrical bearing surface in contact with the second cylindrical bearing surface, the structure including a material having a reduced elastic modulus which allows the first cylindrical bearing surface to deform in response to a concentrated accumulation of strain energy in the structure; and
deforming the first cylindrical bearing surface, thereby distributing the strain energy more uniformly across the first cylindrical bearing surface and reducing the contact pressure between the first and second cylindrical bearing surfaces.

35. The method of claim 34, wherein the well tool comprises a near-bit wellbore reamer.

36. The method of claim 34, wherein the material is disposed adjacent a wall of a seal groove.

37. The method of claim 34, wherein the reduced contact pressure is due to a reduced stiffness of the structure.

38. The method of claim 34, wherein the structure comprises a functionally gradient material.

39. The method of claim 34, wherein the structure comprises a graduated elastic modulus material.

40. The method of claim 34, wherein the structure comprises nano structures therein.

41. The method of claim 34, wherein the structure comprises a first material having a reduced stiffness relative to a second material which supports the first cylindrical bearing surface in contact with the second cylindrical bearing surface.

* * * * *